(12) United States Patent
Marinescu et al.

(10) Patent No.: US 11,391,019 B2
(45) Date of Patent: Jul. 19, 2022

(54) SYSTEM FOR ROUTING FLUID IN FLUID SYSTEMS OF MACHINES

(71) Applicant: Caterpillar Inc., Peoria, IL (US)

(72) Inventors: Dragos Marinescu, Montgomery, IL (US); Srinivas Venkata Vasa, Aurora, IL (US); Adrian Stefan Spanoche, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 162 days.

(21) Appl. No.: 16/778,299

(22) Filed: Jan. 31, 2020

(65) Prior Publication Data

US 2021/0238826 A1  Aug. 5, 2021

(51) Int. Cl.
 *E02F 9/22* (2006.01)
 *F16B 2/02* (2006.01)
 *E02F 9/08* (2006.01)

(52) U.S. Cl.
 CPC .......... *E02F 9/2271* (2013.01); *E02F 9/0875* (2013.01); *E02F 9/2267* (2013.01); *E02F 9/2275* (2013.01); *F16B 2/02* (2013.01)

(58) Field of Classification Search
 USPC .......... 248/230.5, 230.6, 229.24, 229.25, 62, 248/67.7, 68.1, 73, 74.1, 74.4
 See application file for complete search history.

(56) References Cited

U.S. PATENT DOCUMENTS 3,397,431 A * 8/1968 Walker ...................... F16L 5/14
                                                        403/344
3,616,940 A * 11/1971 Milner, Jr. ............ B66F 11/044
                                                        212/288
5,098,047 A * 3/1992 Plumley ................ F16L 3/2235
                                                        248/68.1
5,638,616 A    6/1997 Kishi
5,996,945 A * 12/1999 Coles .................... F16L 3/2235
                                                        24/16 R
2017/0355114 A1   12/2017 Perkins

FOREIGN PATENT DOCUMENTS

| CN | 101204770 B | 7/2011 |
| CN | 208397453 U | 1/2019 |
| JP | H08199614 A | 8/1996 |
| KR | 1192426 B1 | 10/2012 |
| KR | 1290646 B1 | 7/2013 |
| KR | 1312807 B1 | 9/2013 |

* cited by examiner

*Primary Examiner* — Alfred J Wujciak
(74) *Attorney, Agent, or Firm* — Leydig, Voit & Mayer, Ltd.

(57) ABSTRACT

A system for routing fluid in a fluid system of a machine includes one or more hoses and one or more clamping arrangements. The hoses are adapted to extend from a main control valve, pass through a frame portion of the machine, and reach up to an end of a fluid cylinder to route fluid between the main control valve and the fluid cylinder and actuate the fluid cylinder. An actuation of the fluid cylinder powers a movement of an implement of the machine. The clamping arrangements are adapted to secure corresponding portions of the one or more hoses to corresponding locations on the frame portion of the machine. One clamping arrangement is interchangeable with another clamping arrangement to secure a corresponding portion of any hose of the one or more hoses to a corresponding location on the frame portion of the machine.

13 Claims, 4 Drawing Sheets

SYSTEM FOR ROUTING FLUID IN FLUID SYSTEMS OF MACHINES

TECHNICAL FIELD

The present disclosure relates to fluid systems, such as hydraulic systems, in machines, e.g., construction machines. More particularly, the present disclosure relates to a system for routing fluid in a fluid system of a machine to facilitate actuation of an implement with respect to a linkage of a machine.

BACKGROUND

Machines, such as wheel loaders, are utilized in a variety of fields and environments, such as in mining and construction, to transport a quantity of material, including soil, dirt, debris, rocks, stones, disintegrated particles, and the like, from one site to another. In this regard, such machines commonly include an implement, typically in the form of a bucket having a cavity, that may receive the material therein. Once the material is received and loaded into the implement, the machine may transport the material to a suitable location to release and dump the material from the implement.

For the receipt, transport, and dump of the material, the implement is typically required to be moved to a myriad of orientations. For example, during a release or a dumping of the material, the implement may need to be tiltably oriented so as to ease the material's exit from the implement under gravity. Such movement of the implement is generally facilitated by an implement actuation system, such as a fluid system (e.g., a hydraulic system) associated with the machine. Such fluid systems are known to include a number of parts, for example, multiple interconnected hoses, castings, couplers, and the like, that, as a whole, in one or more instances, add to the bulk and complexity of the fluid system, and for which suitable expenses need to be apportioned.

Chinese Patent No. 208397453 relates to a clamp assembly for coupling a pipe in a vehicle. The pipe clamp assembly includes a first pipe clamp and a second pipe clamp connectable together by way of a connecting rod.

SUMMARY OF THE INVENTION

In an aspect, the present disclosure relates to a system for routing fluid in a fluid system of a machine. The system includes one or more hoses adapted to extend from a main control valve, pass through a frame portion of the machine, and reach up to an end of a fluid cylinder to route fluid between the main control valve and the fluid cylinder and actuate the fluid cylinder. An actuation of the fluid cylinder powers a movement of an implement of the machine. Further, the system includes one or more clamping arrangements that are adapted to secure corresponding portions of the one or more hoses to corresponding locations on the frame portion of the machine. One clamping arrangement is interchangeable with another clamping arrangement to secure a corresponding portion of any hose of the one or more hoses to a corresponding location on the frame portion of the machine.

In another aspect, the present disclosure is directed to a fluid system for a machine. The fluid system includes a main control valve, a fluid cylinder, and a system for routing fluid in the fluid system. The main control valve is adapted to regulate fluid, while the fluid cylinder is adapted to receive fluid for actuation and power a movement of an implement of the machine. The system includes one or more hoses adapted to extend from the main control valve, pass through a frame portion of the machine, and reach up to an end of the fluid cylinder to route fluid between the main control valve and the fluid cylinder and actuate the fluid cylinder. Further, the system includes one or more clamping arrangements adapted to secure corresponding portions of the one or more hoses to corresponding locations on the frame portion of the machine. One clamping arrangement is interchangeable with another clamping arrangement to secure a corresponding portion of any hose of the one or more hoses to a corresponding location on the frame portion of the machine.

In yet another aspect, the present disclosure relates to a machine. The machine includes a frame portion, a linkage, an implement, and a fluid system. The linkage is movably coupled to the frame portion. The implement is supported on the linkage and is movable with respect to the linkage. The fluid system includes a main control valve adapted to regulate fluid and a fluid cylinder adapted to receive fluid for actuation and power a movement of the implement with respect to the linkage. The fluid system further includes a system for routing fluid in the fluid system. The system includes one or more hoses adapted to extend from the main control valve, pass through the frame portion of the machine, and reach up to an end of the fluid cylinder to route fluid between the main control valve and the fluid cylinder and actuate the fluid cylinder. The system also includes one or more clamping arrangements adapted to secure corresponding portions of the one or more hoses to corresponding locations on the frame portion of the machine. One clamping arrangement is interchangeable with another clamping arrangement to secure a corresponding portion of any hose of the one or more hoses to a corresponding location on the frame portion of the machine.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
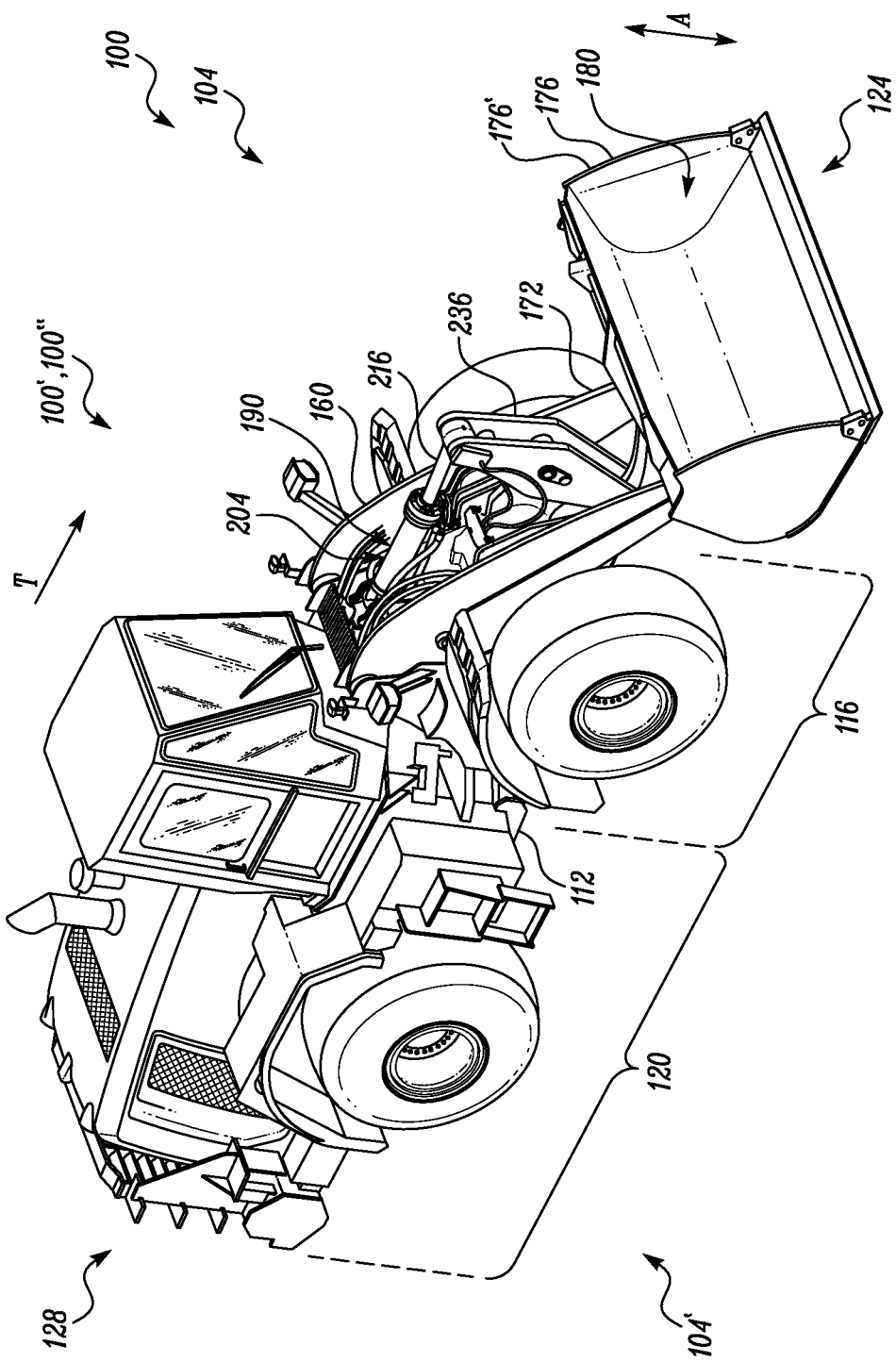
FIG. 1 is a perspective view of a machine, in accordance with an embodiment of the present disclosure.

Referring to FIG. 1, a machine 100 is illustrated. As exemplarily depicted, the machine 100 is a loader machine 104, such as a wheel loader 104', although one or more aspects of the present disclosure may be applied to various other machines, e.g., construction and mining machines, such as dozers, backhoes, excavators, and shovels. As exemplarily depicted, the machine 100 may include a split-chassis configuration that underlies the outer panels and the outer structures of the machine 100, as shown. The split-chassis configuration may mean that an underlying chassis 112 of the machine 100 may be spilt into more than one part. Exemplarily, the chassis 112 of the machine 100 may be split into two parts, thus defining a first frame portion 116 and a second frame portion 120.

The first frame portion 116 may be disposed towards a forward end 124 of the machine 100, while the second frame portion 120 may be disposed towards the rearward end 128 of the machine 100. The terms 'forward' and 'rearward' may be understood as being defined exemplarily according to a direction of general machine motion in which the forward end 124 leads the rearward end 128 (see direction, T). The first frame portion 116 may be hinged or pivotally coupled to the second frame portion 120 so as to articulate relative to the second frame portion 120. Therefore, in some embodiments, the machine 100 may embody an articulated machine 100' or an articulated loader machine 100". For ease and simplicity, the first frame portion 116 may be interchangeably referred to as a frame portion 116, hereinafter.

Figure 2:
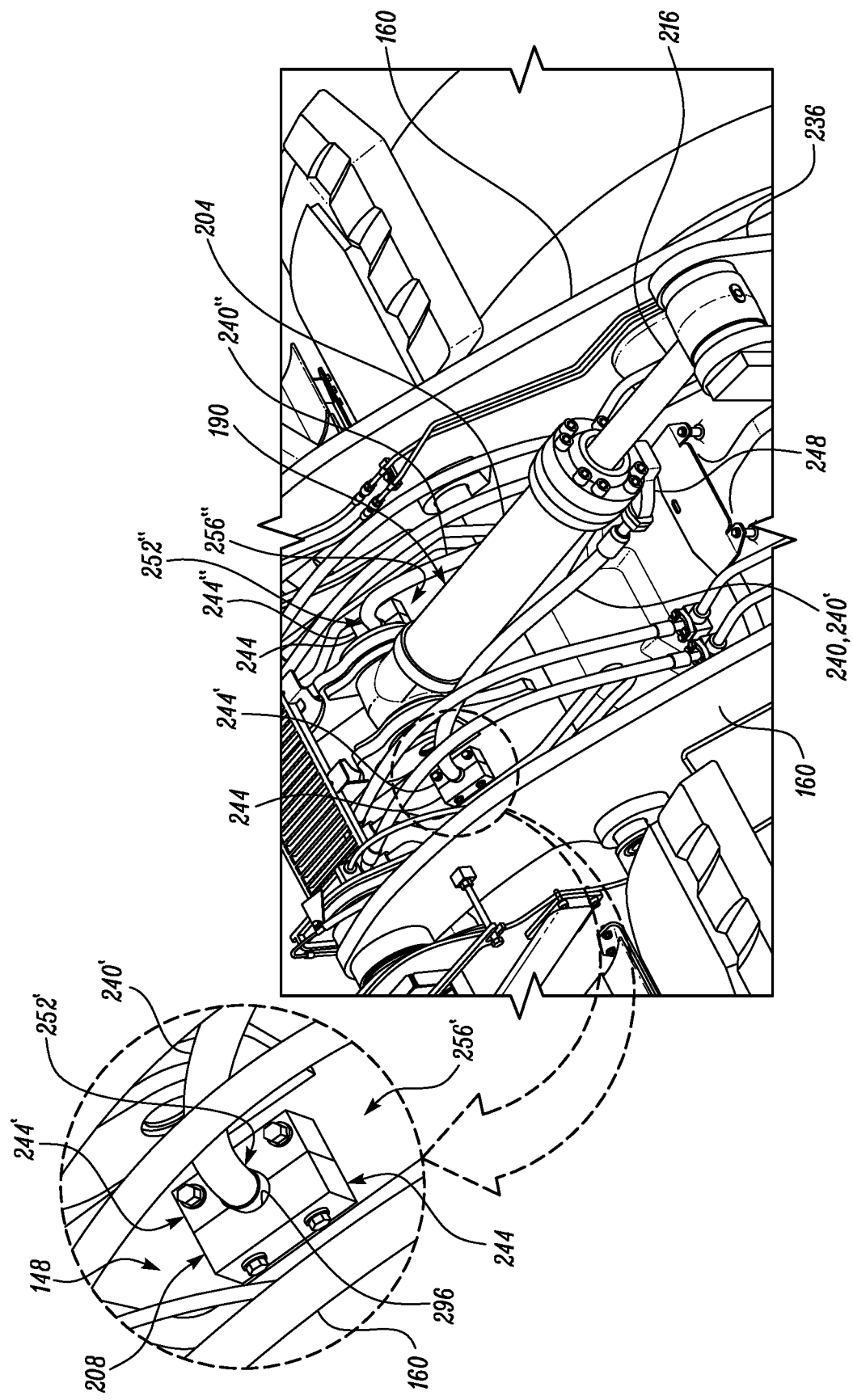
FIG. 2 is a close-up, enlarged view of a portion of the machine, illustrating one or more components of a fluid system of the machine, in accordance with an embodiment of the present disclosure.
Figure 3:
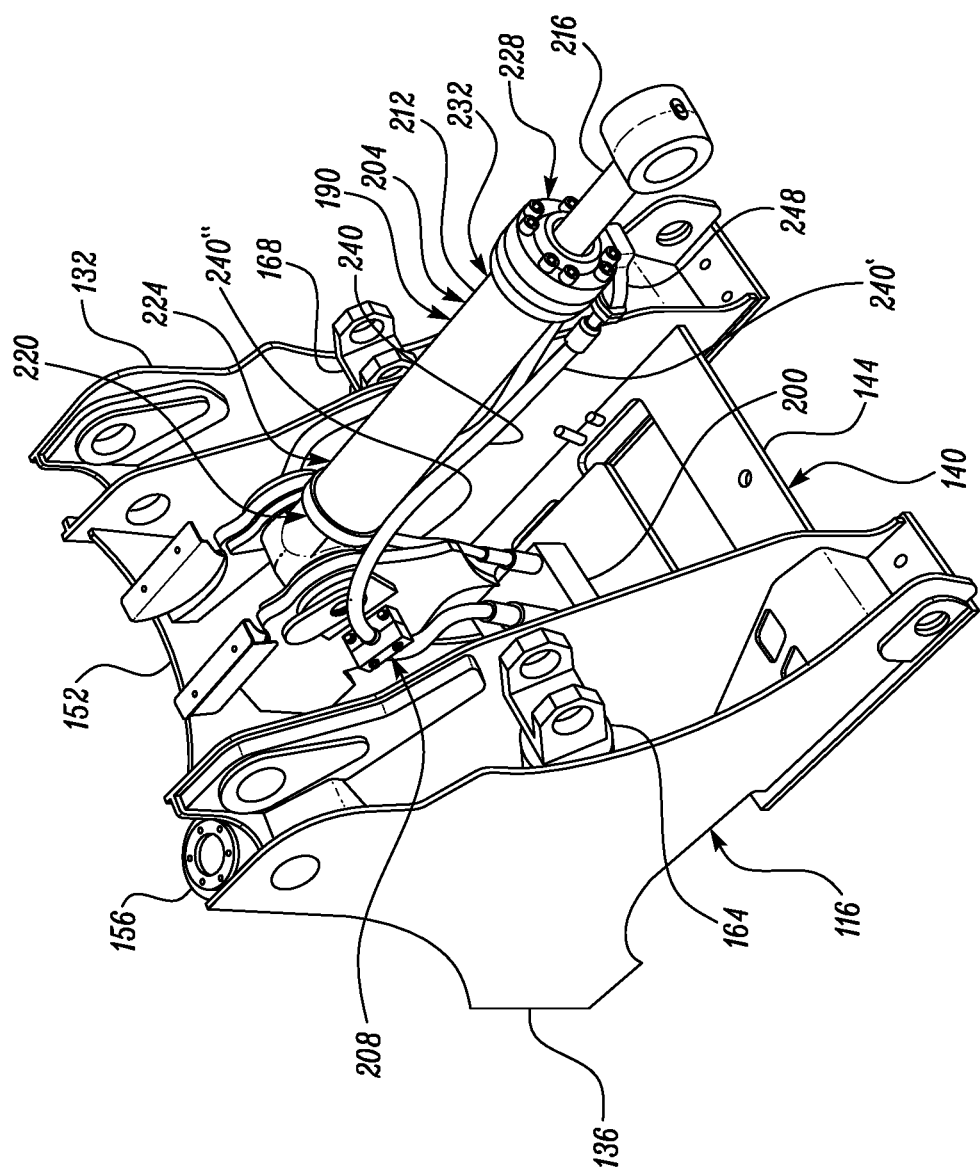
FIG. 3 is a frame portion of the machine in conjunction with one or more components of the fluid system, in accordance with an embodiment of the present disclosure.

Referring to FIG. 3, certain aspects of the frame portion 116 is discussed. As shown, the frame portion 116 may include a left-sided frame bracket 132 and a right-sided frame bracket 136. The terms 'left' and 'right', as used herein, may be envisioned and understood when viewing the machine 100 from the rearward end 128 towards the forward end 124. The frame portion 116 may include an intermediate connection structure 140, extending (e.g., transversally) between the left-sided frame bracket 132 and the right-sided frame bracket 136. The intermediate connection structure 140 may include a base frame portion 144 and a roof frame portion 148 (see FIG. 2) raised away (generally oppositely) to the base frame portion 144. Further, the intermediate connection structure 140 of the frame portion 116 may include a rearward wall portion 152 on which a hinge bracket 156 may be structured and arranged. The hinge bracket 156 may be hinged relative to the second frame portion 120 (FIG. 1) of the machine 100, allowing the second frame portion 120 to be articulated or be pivotally coupled to the first frame portion 116. The base frame portion 144, roof frame portion 148, right-sided frame bracket 136, and the left-sided frame bracket 132, of the intermediate connection structure 140 may be all fabricated suitably with each other so as to impart a rigid and unitary construction to the intermediate connection structure 140.

Referring back to FIGS. 1 and 2, the machine 100 may include a linkage 160. The linkage 160 may be pivotally coupled to the frame portion 116. A set of actuators (e.g., hydraulic actuators) may be coupled between the linkage 160 and the frame portion 116. For example, one actuator 164 of the set of actuators may be coupled between the right-sided frame bracket 136 and the one side (right side) of the linkage 160, while the other actuator 168 of the set of actuators may be coupled between the left-sided frame bracket 132 and another side (left side) of the linkage 160. In so doing, when the set of actuators 164, 168 are actuated (e.g., synchronously), the set of actuators 164, 168 may power a pivotal movement of the linkage 160 relative to the frame portion 116. Said pivotal movement may cause an end 172 of the linkage 160, disposed remote to the frame portion 116, be selectively raised and lowered relative to the frame portion 116 (and/or to a ground on which the machine 100 may be stationed) (see direction, A) (FIG. 1). A lifting of the end 172 of the linkage 160 relative to the frame portion 116 of the machine 100 may be referred to as a lift function associated with the linkage 160.

The machine 100 may include an implement 176. The implement 176 may define a cavity 180, and thus, in one embodiment, the implement 176 may include a bucket 176', as exemplarily shown. The implement 176 may be applied for the manipulation, receipt, and/or movement, of material, such as soil, rocks, stones, debris, disintegrated particles, etc., from one location to another, by the machine 100. The implement 176 may be supported on the linkage 160 and may be movable with respect to the linkage 160. The implement 176 may be pivotally coupled to the end 172 of the linkage 160. It may be noted that certain aspects of the present disclosure are directed towards a fluid system 190 that is adapted to facilitate the functioning and operation of the implement 176 (i.e., the tilting or pivotal movement of the implement 176 relative to the linkage 160). A tilting movement of the implement 176 relative to the linkage 160 (or to the end 172 of the linkage 160) may be referred to as a tilt function associated with the implement 176.

The fluid system 190 may include many components, and among the many components, the fluid system 190 may include a main control valve 200, a fluid cylinder 204, and a system 208 for routing fluid in the fluid system 190. Aspects related to each of the main control valve 200, the fluid cylinder 204, and the system 208, will now be discussed. It may be noted that the roof frame portion 148 of the frame portion 116, as depicted in FIG. 3, is removed or omitted from FIG. 3 so as to provide visual access to an interior of the frame portion 116 where one or more components (e.g., the main control valve 200) of the fluid system 190 are exemplarily arranged.

The main control valve 200 may be arranged on the base frame portion 144 of the frame portion 116, as exemplarily depicted. The main control valve 200 may be fluidly coupled to a fluid pump (not shown), and, accordingly, may receive fluid (e.g., a hydraulic fluid) pumped by the fluid pump from a fluid reservoir (not shown) and is adapted to regulate the fluid. The main control valve 200 may guide the received fluid for supply of the fluid to various actuators, e.g., to the set of actuators 164, 168 coupled between the linkage 160 and the frame portion 116 to power the lift function associated with the linkage 160. In some embodiments, the main control valve 200 may also facilitate transfer of the fluid to the fluid cylinder 204 to facilitate the tilt function associated with the implement 176. Aspects of the tilt function will be understood from the discussions attested further below.

The fluid cylinder 204 may be a hydraulic fluid cylinder and may include a cylinder portion 212 and a rod portion 216. The rod portion 216 may be extendable and retractable with respect to the cylinder portion 212. The cylinder portion 212 may define a head end 220 (and a head end portion 224) and a rod end 228 (and a rod end portion 232). It may be noted that the rod portion 216 may include a piston (not shown) that is slidably disposed within the cylinder portion 212 and which may be pushed selectively towards the head end 220 or towards the rod end 228 depending on the direction of fluid influx into the cylinder portion 212, during operation. The head end portion 224 may be defined between the head end 220 and the piston, at any given instant, while the rod end portion 232 may be defined between the rod end 228 and the piston, at any given instant.

The head end 220 of the fluid cylinder 204 may be pivotally coupled to the frame portion 116 (e.g., to the roof frame portion 148 of the frame portion 116), while the rod portion 216 may extend out through the rod end 228 and be pivotally coupled to the implement 176 (e.g., by way of a bell crank mechanism 236, as shown). An actuation of the fluid cylinder 204 may cause the rod portion 216 to be extended or retracted relative to the cylinder portion 212 (or to the rod end 228 of the cylinder portion 212), in turn causing the implement 176 to be pivotally moved back and forth with respect to (the end 172 of) the linkage 160. Effectively, the actuation of the fluid cylinder 204 (by receipt of the fluid) powers a movement of the implement 176 or facilitates execution of the tilt function associated with the implement 176.

The system 208 may be adapted to route fluid in the fluid system 190, and, particularly, between the main control valve 200 and the fluid cylinder 204 of the fluid system 190. The system 208 includes one or more hoses 240 and one or more clamping arrangements 244.

The one or more hoses 240 may relate or correspond to two hoses. In this regard, the hoses 240 include a first hose 240' and a second hose 240", as shown in FIGS. 2 and 3. Both the first hose 240' and the second hose 240" may be coupled (e.g., fluidly coupled) between the main control valve 200 and the fluid cylinder 204. Further, each of the first hose 240' and the second hose 240" extend from the main control valve 200, pass through the frame portion 116 (e.g., through corresponding apertures (not shown) formed in the roof frame portion 148 in the frame portion 116), and reach up to an end (e.g., the rod end 228) of the fluid cylinder 204. It may be noted that both the first hose 240' and the second hose 240" may be single piece hoses.

In some embodiments, the fluid system 190 includes a fluid router 248. The fluid router 248 may be disposed at the rod end 228 of the fluid cylinder 204 and may define two independent conduits (not shown) therein. The two hoses (i.e., first hose 240' and the second hose 240") may respectively be fluidly coupled to the independent conduits of the fluid router 248, and the independent conduits of the fluid router 248 may be in turn respectively fluidly coupled to the rod end portion 232 and head end portion 224 of the cylinder portion 212 of the fluid cylinder 204 (e.g., via additional hoses).

By way of such an arrangement, and as an example, the first hose 240' may be fluidly coupled with the head end portion 224 to facilitate passage of fluid therethrough with respect to the head end portion 224 of the fluid cylinder 204 and the second hose 240" may be fluidly coupled with the rod end portion 232 to facilitate passage of fluid therethrough with respect to the rod end portion 232 of the fluid cylinder 204. Also, in that manner, the fluid router 248 may facilitate passage of fluid between the first hose 240' and the head end portion 224 and may facilitate passage of fluid between the second hose 240" and the rod end portion 232. Given the independent conduits of the fluid router 248, the passage of fluid between the first hose 240' and the head end portion 224 may be independent of the passage of fluid between the second hose 240" and the rod end portion 232.

The clamping arrangements 244 are adapted to secure corresponding portions of the first hose 240' and the second hose 240" to corresponding locations on the frame portion 116 of the machine 100. Given the two hoses (i.e., the first hose 240' and the second hose 240"), two corresponding clamping arrangements 244 may be contemplated, i.e., namely, a first clamping arrangement 244' and a second clamping arrangement 244" is disclosed.

The first clamping arrangement 244' may be adapted to secure a first hose portion 252' of the first hose 240' to a first location 256' on the frame portion 116 (i.e., on the roof frame portion 148 of the frame portion 116), while the second clamping arrangement 244" may be adapted to secure a second hose portion 252" of the second hose 240" to a second location 256" on the frame portion 116 (i.e., on the roof frame portion 148 of the frame portion 116) (see FIG. 2). The first clamping arrangement 244' is interchangeable with the second clamping arrangement 244" so as to secure the second hose portion 252" of the second hose 240" to the second location 256" on the frame portion 116. Similar interchangeability is contemplated for the second clamping arrangement 244" as well. Discussions further below are primarily directed towards the first clamping arrangement 244'. Such discussions may be equivalent and suitably applied to the second clamping arrangement 244", as well.

Figure 4:
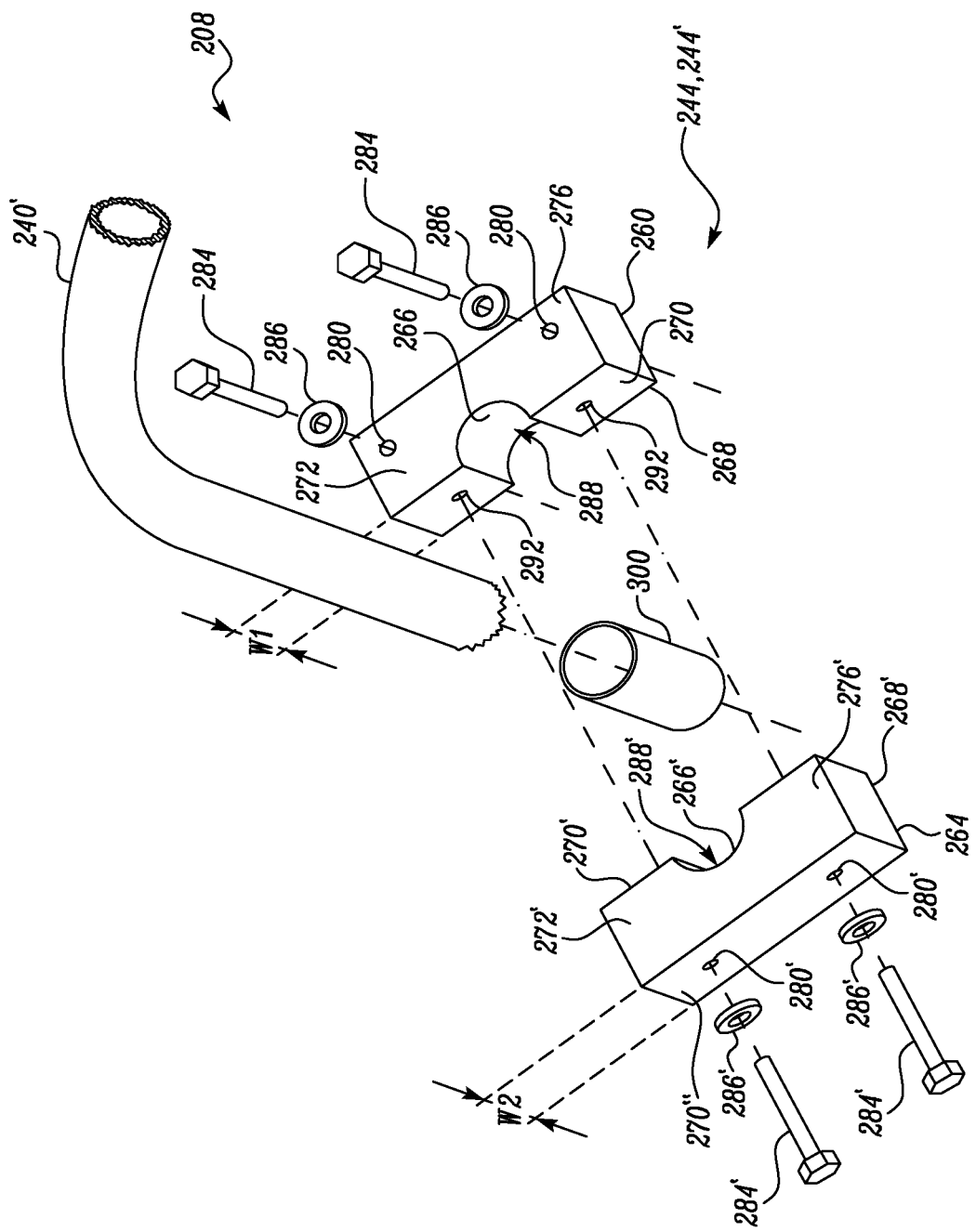
FIG. 4 is an exploded view of a system that is applied for routing fluid in the fluid system of the machine, in accordance with an embodiment of the present disclosure.

Referring to FIG. 4, the first clamping arrangement 244' includes a first clamping block 260 and a second clamping block 264. The first clamping block 260 may include a cuboidal structure, defining six faces, with one of the faces (e.g., a first face 268) (not explicitly visible) being adapted to sit and rest against the first location 256' (see FIG. 2) on the roof frame portion 148 of the frame portion 116. A second face 272 of the six faces is defined opposite to the first face 268. Also, an intermediate face 270 of the six faces of the first clamping block is defined to extend between the first face 268 and the second face 272, as shown. A pair of slots 280 is defined through a body 276 of the first clamping block 260. As shown, the pair of slots 280 extend from the first face 268 up to the second face 272. The pair of slots 280 is adapted to respectively receive a pair of first fasteners 284 that engage into suitable openings (not shown) formed within the roof frame portion 148 at the first location 256', enabling the first clamping block 260 to be coupled and be assembled to the first location 256' of roof frame portion 148 of the frame portion 116. Washers 286 may be provided for assembly with the fasteners 284.

The first clamping block 260 defines a first recess 288. The first recess 288 may be U-shaped and/or semicircular in profile and may extend throughout a width, W1, of the intermediate face 270 (i.e., to extend from the first face 268 up to the second face 272). More particularly, the first recess 288 extends into the body 276 of the first clamping block 260 from the intermediate face 270 and defines a curved cylindrical face 266, with the curved cylindrical face 266 defining a height that spans from the first face 268 up to the second face 272.

The second clamping block 264 may include a structure similar to the structure of the first clamping block 260 and may be assembled to the first clamping block 260 to define (at least partly) the first clamping arrangement 244'. As with the first clamping block 260, the second clamping block 264 includes a cuboidal structure defining six faces, with one of the faces (e.g., a first face 268') (not explicitly visible) being adapted to face or be directed towards the first location 256' on the roof frame portion 148 of the frame portion 116, in assembly of the first clamping arrangement 244' to the roof frame portion 148. A second face 272' of the six faces is defined opposite to the first face 268', as shown.

Also, as with the first clamping block 260, an intermediate face (referred to as a first intermediate face 270') of the six faces of the second clamping block 264 extends between the first face 268' and the second face 272', as shown. A second intermediate face 270" of the six faces is defined oppositely to the first intermediate face 270'. As with the first intermediate face 270', the second intermediate face 270" also extends between the first face 268' and the second face 272'. A pair of slots 280' is defined through a body 276' of the second clamping block 264. As shown, the pair of slots 280' extend from the first intermediate face 270' up to the second intermediate face 270". The pair of slots 280' is adapted to respectively receive a pair of second fasteners 284' that engage into suitable openings 292 formed within the body 276 of the first clamping block 260, enabling the second clamping block 264 to be coupled and be assembled to the first clamping block 260. Washers 286' may be provided for assembly with the fasteners 284'.

In some embodiments, the washers 286 and the washers 286' may be of one and the same type, although owing to factors, such as space constraints, etc., an actual application may require the washers 286 and the washers 286' to be different from each other. Further, in some embodiments, it may be noted that one or more of the fasteners 284 and fasteners 284' may include captive washers—e.g., fasteners 284 may include corresponding washers (similar to washers 286) and/or fasteners 284' may include corresponding washers (similar to washers 286'). In such a case, the washers 286 and the washers 286' may be omitted.

As with the first recess 288 of the first clamping block 260, the second clamping block 264 also defines a recess (referred to as second recess 288'). The second recess 288' may be U-shaped and/or semicircular in profile and may extend across a width, W2, of the first intermediate face 270' (i.e., to extend from the first face 268' up to the second face 272'). More particularly, the second recess 288' extends into the body 276' of the second clamping block 264 from the first intermediate face 270' and defines a curved cylindrical face 266', with the curved cylindrical face 266' defining a height that spans from the first face 268' up to the second face 272'.

It may be noted that in an assembly of the second clamping block 264 to the first clamping block 260, the first recess 288 and the second recess 288' in conjunction are adapted to define a groove 296 (see FIG. 2) for facilitating passage of at least one hose (e.g., the first hose 240') therethrough. In this regard, the groove 296, combinedly defined by the first recess 288 and the second recess 288', may define a structure (e.g., circular or elliptical) which is complementary to an outer structure or an outer profile defined by the first hose 240', so as to freely receive the first hose 240' therein. Further, both the first fasteners 284 and the second fasteners 284', noted above, may include threaded fasteners, such as screws, bolts, and the like.

In some embodiments, the system 208 (or the first clamping arrangement 244') may include a grommet 300 that is adapted to be received and be seated within the groove 296 so as to be positioned as an interface between the groove 296 and the first hose 240'. The grommet 300 may include an elasticized or a compressible body that allows the first hose portion 252' of the first hose 240' passing through the groove 296 to bear upon the grommet 300 and be relatively tightly and immovably retained with respect to the grommet 300, and thus to the first clamping arrangement 244'. One or more exemplary materials by which the grommet 300 may be formed includes a rubber or a polymer.

INDUSTRIAL APPLICABILITY

During an assembly operation, an operator may bring forth the first hose 240' and may suitably couple the first hose 240' to a corresponding port of the main control valve 200. A coupling between such a port and the first hose 240' may be attained according to a customary practice. Thereafter, the operator may guide and route the first hose 240' through the frame portion 116 (e.g., through an aperture (not shown) in the roof frame portion 148 of the frame portion 116), so as to bring the first hose 240' all the way up to the fluid router 248 (e.g., to one of the independent conduits formed within the fluid router 248). A coupling between the first hose 240' and a corresponding conduit of the fluid router 248 may be then carried out and attained according to a customary practice. It may be noted that during transit of the first hose 240' through the roof frame portion 148, the operator may slide the grommet 300 onto the first hose 240', before coupling the first hose 240' to the corresponding conduit of the fluid router 248.

Next, the operator may bring forth the first clamping arrangement 244' and may couple and assemble the first clamping block 260 to the first location 256'—in some embodiments, it may be contemplated that the first location 256' is the same as a site defined in proximity (e.g., in an immediate surrounding) of the aperture of the roof frame portion 148 through which the first hose 240' is passed. To couple and assemble the first clamping block 260 to the first location 256', the operator may insert the first fasteners 284 respectively into the pair of slots 280 formed within the body 276 of the first clamping block 260 such that the first fasteners 284 may be drawn through the first clamping block 260 and may extend out from the first clamping block 260 for an engagement (e.g., a rigid engagement or an immovable engagement) with the first location 256' of the roof frame portion 148 of the frame portion 116. Once the first clamping block 260 is appropriately assembled and coupled to the first location 256' of the roof frame portion 148, the operator may push the grommet 300 (disposed around the first hose 240') into the first recess 288 formed within the body 276 of the first clamping block 260.

Subsequently, the operator may bring forth the second clamping block 264, surround a portion of the grommet 300 that is exposed (or is external to the first recess 288) with the second recess 288', align the pair of slots 280' formed within the second clamping block 264 with the openings 292 of the first clamping block 260, and insert the second fasteners 284' respectively into the pair of slots 280' and the openings 292 so as to couple and assemble the second clamping block 264 with the first clamping block 260. By coupling and assembling the second clamping block 264 to the first clamping block 260, the first recess 288 and the second recess 288' in conjunction define the groove 296 (see FIG. 2), with the grommet 300 acquiring a position within the groove 296 that defines an interface between the groove 296 and the first hose 240'.

It will be appreciated that an assembly of the second hose 240" in relation to the main control valve 200 and the fluid router 248 may remain similar to the assembly of the first hose 240' with the main control valve 200 and the fluid router 248. Further, a coupling and assembling of the second clamping arrangement 244" with respect to the second hose 240" may remain similar to the assembly of the first clamping arrangement 244' with respect to the first hose 240', as has been discussed above.

With both the first hose 240' and the second hose 240" being respectively retained by the first clamping arrangement 244' and the second clamping arrangement 244", the overall configuration associated with arranging the hoses 240 is simplified. More particularly, the complexity associated with the usage of the multiple hoses, castings, and couplers, is reduced or altogether obviated owing to the use of the single piece first hose 240' and the single piece second hose 240". Furthermore, an operator is at liberty to leverage the interchangeability between the clamping arrangements 244 and may use one clamping arrangement 244', 244" over the other during an assembly process to secure any of the first hose 240' or the second hose 240" to the corresponding locations (i.e., first location 256' or second location 256") on the frame portion 116, thus making the overall assembly process flexible and easier. It is further attested that the incorporation of the system 208 (including the hoses 240 and the clamping arrangements 244) into the frame portion 116 of the machine 100 results in significant cost reduction.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

What is claimed is:

1. A system for routing fluid in a fluid system of a machine, the system comprising:
   one or more hoses adapted to extend from a main control valve, pass through a frame portion of the machine, and reach up to an end of a fluid cylinder to route fluid between the main control valve and the fluid cylinder and actuate the fluid cylinder, wherein an actuation of the fluid cylinder powers a movement of an implement of the machine; and
   one or more clamping arrangements adapted to secure corresponding portions of the one or more hoses to corresponding locations on the frame portion of the machine, each one or more clamping arrangement including
      a first pair of fasteners;
      a second pair of fasteners;
      a first clamping block adapted to be coupled and be assembled to a corresponding location of the frame portion, the first clamping block includes a first pair of slots adapted to receive the first pair of fasteners to couple the first clamping block to the frame portion of the machine, the first clamping block further including a pair of openings; and
      a second clamping block adapted to be coupled and be assembled to the first clamping block, the second clamping block includes a second pair of slots, the second pair of slots and the pair of openings being adapted to receive the second pair of fasteners to assemble and couple the second clamping block to the first clamping block,
   wherein one clamping arrangement of the one or more clamping arrangements is interchangeable with another clamping arrangement of the one or more clamping arrangements to secure a corresponding portion of any hose of the one or more hoses to a corresponding location on the frame portion of the machine.

2. The system of claim 1, wherein the one or more hoses include a first hose and a second hose,
   the first hose adapted to facilitate passage of fluid therethrough with respect to a head end portion of the fluid cylinder, and
   the second hose adapted to facilitate passage of fluid therethrough with respect to a rod end portion of the fluid cylinder.

3. The system of claim 2, wherein the first hose and the second hose are adapted to be fluidly coupled to a fluid router disposed at the end of the fluid cylinder, the fluid router adapted to facilitate passage of fluid between the first hose and the head end portion and facilitate passage of fluid between the second hose and the rod end portion, independently.

4. The system of claim 1, wherein the first clamping block defines a first recess, the second clamping block defines a second recess, and in an assembly of the second clamping block to the first clamping block, the first recess and the second recess in conjunction are adapted to define a groove for facilitating passage of at least one hose of the one or more hoses therethrough.

5. The system of claim 4 further comprising a grommet adapted to be received within the groove and be positioned as an interface between the at least one hose and the groove.

6. A fluid system for a machine, the fluid system comprising:
   a main control valve adapted to regulate fluid;
   a fluid cylinder adapted to receive fluid for actuation and power a movement of an implement of the machine; and
   a system for routing fluid in the fluid system, the system including:
      one or more hoses adapted to extend from the main control valve, pass through a frame portion of the machine, and reach up to an end of the fluid cylinder to route fluid between the main control valve and the fluid cylinder and actuate the fluid cylinder; and
      one or more clamping arrangements adapted to secure corresponding portions of the one or more hoses to corresponding locations on the frame portion of the machine, each one or more clamping arrangement including
         a first clamping block adapted to be coupled and be assembled to a corresponding location of the frame portion; and
         a second clamping block adapted to be coupled and be assembled to the first clamping block,
      wherein one clamping arrangement of the one or more clamping arrangements is interchangeable with another clamping arrangement of the one or more clamping arrangements to secure a corresponding portion of any hose of the one or more hoses to a corresponding location on the frame portion of the machine.

7. The fluid system of claim 6, wherein the one or more hoses include a first hose and a second hose,
   the first hose facilitating passage of fluid therethrough with respect to a head end portion of the fluid cylinder, and
   the second hose facilitating passage of fluid therethrough with respect to a rod end portion of the fluid cylinder.

8. The fluid system of claim 7 further comprising a fluid router disposed at the end of the fluid cylinder, wherein the first hose and the second hose are fluidly coupled to the fluid router, the fluid router facilitating passage of fluid between the first hose and the head end portion and facilitating passage of fluid between the second hose and the rod end portion, independently.

9. The fluid system of claim 6, wherein the first clamping block defines a first recess, the second clamping block defines a second recess, and in an assembly of the second clamping block to the first clamping block, the first recess and the second recess in conjunction are adapted to define a groove for facilitating passage of at least one hose of the one or more hoses therethrough.

10. The fluid system of claim 9, wherein the system includes a grommet adapted to be received within the groove and be positioned as an interface between the at least one hose and the groove.

11. The fluid system of claim 6, wherein the system includes one or more first fasteners adapted to couple and assemble the first clamping block to the corresponding location on the frame portion.

12. The fluid system of claim 6, wherein the system includes one or more second fasteners adapted to couple and assemble the second clamping block to the first clamping block.

13. The fluid system of claim 6 further including a first pair of fasteners and a second pair of fasteners, and wherein the first clamping block includes a first pair of slots adapted to receive the first pair of fasteners to couple the first clamping block to the frame portion of the machine, wherein the second clamping block includes a second pair of slots and the first clamping block includes a pair of openings, the second pair of slots and the pair of openings being adapted to receive the second pair of fasteners to assemble and couple the second clamping block to the first clamping block.

* * * * *